United States Patent [19]

McCord

[11] 3,750,734

[45] Aug. 7, 1973

[54] VEHICLE TRACTION DEVICE AND METHOD OF MOUNTING

[76] Inventor: Jimmy C. McCord, Rt. 4 Box 20, Roanoke, Ala. 36274

[22] Filed: Mar. 17, 1972

[21] Appl. No.: 235,668

[52] U.S. Cl. .............................................. 152/220
[51] Int. Cl. .......................................... B60c 27/22
[58] Field of Search.................... 152/220, 208, 217, 152/214, 213, 221, 191; 238/14

[56] References Cited
UNITED STATES PATENTS

| 3,696,852 | 10/1972 | Oulman | 152/220 |
|---|---|---|---|
| 3,547,177 | 12/1970 | Valley | 152/220 |
| 2,222,786 | 11/1940 | Snyder | 152/220 |

Primary Examiner—Gerald M. Forlenza
Assistant Examiner—Richard A. Bertsch
Attorney—Walter M. Rodgers

[57] ABSTRACT

To improve traction of a vehicle having dual type wheels and pneumatic tires, an elongated flexible traction device including a plurality of traction blocks having tread surfaces are threadedly mounted on a flexible cable and each block is provided with a radial flange which extends inwardly between the tires of the dual wheel. Flexible coupling means is secured to one end of the traction means and is inserted between the tires and through an aperture in one part of the wheel and is then secured to the wheel. The vehicle is first driven over the flexible traction device after having been coupled at one end to the wheel. After the other end of the traction device reaches a position atop the wheel, a flexible anchoring chain is inserted between the tires and outwardly through an aperture in one of the wheel parts and is then anchored by over-center adjustable toggle means which itself is secured at one end in an aperture formed in the wheel part and at the other end to a selected length of the anchoring chain.

2 Claims, 7 Drawing Figures

PATENTED AUG 7 1973　　　　　　　　　　　　　　3,750,734

VEHICLE TRACTION DEVICE AND METHOD OF MOUNTING

Conventional vehicle traction chains and other conventional traction devices tend to shift position relative to the associated pneumatic tire due to the fact that the tire is radially compressed at the lowermost portion thereof which is engageable with the surface over which the vehicle is being driven and because many known traction devices are loosely mounted about the vehicle tire.

According to this invention flexible traction means is provided with coupling means which is inserted between the parts of a dual wheel and between the two pneumatic tires and secured to an aperture in one of the wheel parts. With the traction device disposed along a tread surface, the vehicle is driven over the traction device and tension throughout its length is maintained due to the fact that the portion of the tire which engages the tread surface is compressed radially and such compression progresses about the periphery of the tire during the mounting operation of the traction device. According to a feature of the invention this established tension force is maintained by simply securing an anchoring chain to the end of the traction device which is the last to be mounted and inserting this chain between the tires and through an aperture in one of the wheel parts. Thereafter an over-center toggle device secured at one end in an aperture in one wheel part is connected at its other end with a link of the anchoring chain and then toggled over-center into its locked or tightened position. Thus according to this invention the traction device is effectively and securely disposed about the two tires of a dual wheel and takes advantage of the inherent radial compression of the tires during the mounting operation. This invention is an improvement over the invention of my U.S. Pat. No. 3,532,149.

For a better understanding of the invention reference may be had to the following detailed description taken in conjunction with the accompanying drawings in which FIG. 1 is a schematic partial side view of a vehicle and of a traction device constructed according to this invention, the traction device being depicted in its initial condition during a mounting operation with one end secured by coupling means to one part of the dual wheel;

FIG. 6 is a side view of a coupling device constituting an adjustable anchoring means used in accordance with one aspect of the invention; and in which

Figure 1:
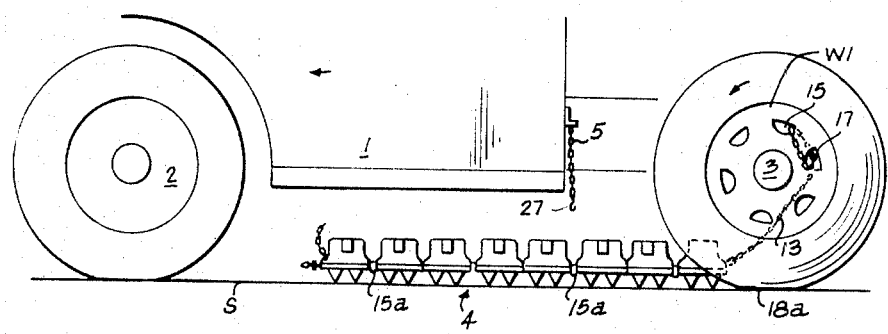

In the drawings the numeral 1 generally designates a schematically represented vehicle. The numerals 2 and 3 designate two of the wheels of the vehicle 1 and the numeral 4 generally designates a traction device while the numeral 5 designates a removal chain affixed to the frame of vehicle 1 for facilitating removal of the traction device 4 after it has served its purpose.

Figure 5:
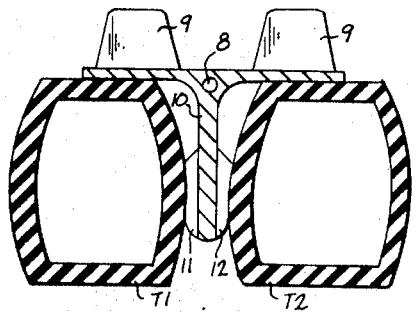
FIG. 5 is a cross-sectional view taken along the line designated 5—5 in FIG. 3.

The traction device constructed according to this invention includes a flexible cable 6 on which a plurality of traction blocks 7 are threadedly mounted, each traction block being provided with an aperture 8 therethrough for receiving the flexible cable 6. Each traction block is provided with a plurality of cleats 9 along its tread surface and on the opposite side thereof is provided with a medial flange 10. As is best shown in FIG. 5, flange 10 is disposed between the two tires T1 and T2 when the traction device is mounted in its service position. Furthermore spacer elements 11 and 12 are mounted on each side of flange 10 and serve to prevent substantial sidewise relative motion between each traction block 7 and the tires T1 and T2.

For the purpose of coupling one end of the flexible traction device 4 with the wheel of the vehicle, a flexible coupling chain 13 is secured to one end of the coupling device 4 in any suitable manner.

In order to anchor the opposite end of the traction device securely and firmly to the vehicle wheel, a flexible anchoring chain 14 is secured to the other end of the flexible traction device 4.

Figure 2:
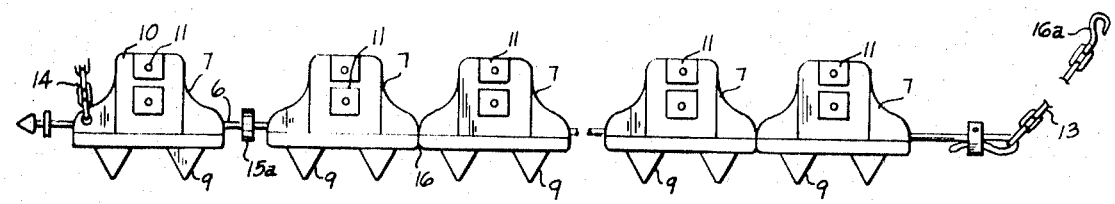
FIG. 2 is an enlarged side view of a coupling device constructed according to this invention.

As is apparent in FIGS. 1 and 2, a degree of lost motion is provided between the flexible cable 6 and the traction blocks 7 and grommet-like spacer elements 15a are interposed between some but not all of the adjacent traction blocks. This arrangement accommodates shifting of each block along the length of the cable 6 without establishing an undue stress in the cable due to bending moment about the corners such as are indicated at 16 as the traction device assumes a circular contour about the tires of the wheel.

In order to mount the traction device 4 onto the wheel 3, the traction device 4 is first laid out along the tread surface S as shown in FIG. 1 with one end thereof immediately adjacent the wheel 3 and with the flange 10 of the end traction block interposed between the tires T1 and T2. Flexible coupling chain 13 is inserted between the tires T1 and T2 and hence through aperture 15 formed in one part W1 of the wheel 3. The chain 13 is then anchored by means of hook 16 which is mounted into aperture 17 formed in wheel part W1. The vehicle is then driven toward the left as shown in FIG. 1 so as to ride up over the flexible traction device 4. Of course the tires T1 and T2 are compressed at their lowermost parts by the weight of vehicle 1 as indicated at 18. Chain 13 tends to swing about the axle to establish substantial tension in this chain and such tension is maintained due to the progressive compression and succeeding expansion of tires T1 and T2 as the vehicle moves toward the left and as the wheel 3 rotates in a counter clockwise direction.

Figures 3, 4:
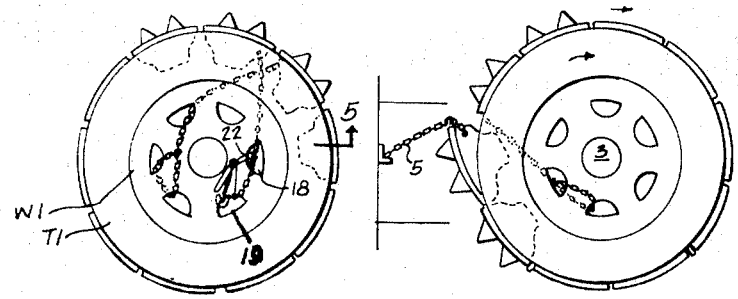
FIG. 3 is a side view of a wheel with a traction device constructed according to this invention mounted thereon.
FIG. 4 is a side view similar to FIG. 3 but showing the traction device in its initial stages of removal.
Figure 6:
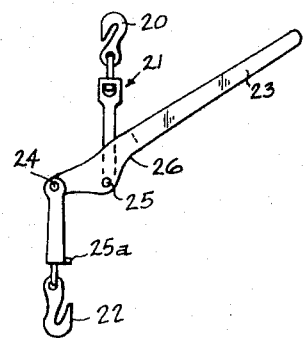

After the wheel rotates a certain distance, it appears as shown in FIG. 3. At this point the anchoring chain 14 is disposed substantially atop the wheel and thus may simply be dropped between the tires T1 and T2 and falls by gravity alongside an aperture such as 18 formed in wheel part W1. This chain is then drawn outwardly through aperture 18 in wheel part W1 and a selected link of anchoring chain 14 is engaged by the hook 20 of the toggle device 21 best shown in FIGS. 6 and 7. Hook 22 of toggle device 21 is inserted as best shown in FIG. 3 into an aperture such as 19 in wheel part W1 and the toggle lever 23 is pivoted about the pivots 24 and 25 by moving the toggle lever in a clockwise direction as best shown in FIG. 6. Of course this action tends to draw hooks 20 and 22 toward each other as is well understood in the art. After the toggle lever 23 is swung in a clockwise direction the stop element 25 engages the surface 26 of lever 23 and the parts are secured in position as shown in FIG. 3. Of course the tension imparted to anchoring chain 14 by the toggle 21 is generally comparable to the tension of chain 13 so that a substantial tension exists throughout the length of anchoring device 4 thus causing the traction device 4 snugly to grip the tires T1 and T2 with little if any relative motion therebetween. Thus according to the invention a secure and heavy duty traction device is provided which accommodates motion of the wheels such as 2 and 3 in either direction and over rough and irregular terrain.

In dismounting the traction device 4, it is simply necessary to disengage toggle 21 and to remove it completely from the assembly as depicted in FIG. 3. Thereafter the anchoring chain 14 is withdrawn from aperture 18 in wheel part W1. Thereafter removal chain 5 is interconnected via its end hook 27 with a link of anchoring chain 14. The vehicle is then driven toward the right as viewed in FIG. 4 to cause the wheel 3 to rotate in a clockwise direction thereby to withdraw the anchoring device 4 from the tires T1 and T2, such motion being shown in its initial stages in FIG. 4.

Figure 7:
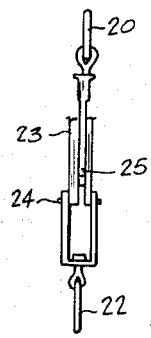
FIG. 7 is an end view of FIG. 6.

From the above it is apparent that a heavy duty device is provided according to the invention and that the toggle arrangement of FIGS. 6 and 7 or its equivalent is utilized in such a way as to apply a tension force to anchoring chain 14 which is roughly equivalent to the tension force imparted to coupling chain 13 by the weight of the vehicle and the progressive compression and succeeding expansion of the tires T1 and T2 as represented at 18a in FIG. 1.

The embodiments of the invention in which an exclusive property or privilege is claimed are defined as follows:

1. A method of mounting an elongated flexible traction device including a plurality of traction blocks each having a traction surface and a medial flange on the side opposite the traction surface to a vehicle dual wheel having a plurality of apertures in at least one wheel part and having spaced side by side slightly compressible pneumatic tires and a common hub, the method comprising the steps of placing the device on a surface over which the wheel is to roll, extending a coupling chain secured to one end of the device between the tires and through an aperture in one part of the wheel, anchoring said coupling chain to said one part of the wheel, rolling the wheel over the device until the other end of the device is disposed substantially atop the wheel and so that the flanges of said blocks are disposed between the tires and with the device under tension sufficient to compress the tires somewhat, extending an anchoring chain secured to the other end of the device between the tires so that such chain falls by gravity alongside an aperture in one part of the wheel, drawing said anchoring chain through said aperture, securing one end of a toggle clamp in another aperture in said part of the wheel, connecting the other end of said toggle clamp to a selected link in said anchoring chain and operating said toggle clamp to its tightened position all in such manner as to impart a tension force to the other end of said traction device and a compression force to the tires thereat so that a substantial tension force is established in said traction device throughout the length thereof irrespective of the part of the wheel which is in contact with said surface.

2. A traction device for a vehicle having an apertured dual wheel with spaced side by side slightly compressible pneumatic tires and a common hub, said device comprising elongated flexible traction means including a cable, a plurality of traction blocks threaded onto said cable and each having a high friction tread surface and a central flange arranged for disposition between the tires and each having corner defining ends, flexible coupling means secured to one end of said traction means and interposed between said tires and between the parts of said dual wheel and disjointably secured to said wheel so that turning motion of the wheel in one pulling direction imparts tension to said traction means while the weight of the vehicle imparts a degree of radial compression to said pneumatic tires and winds said coupling means about at least a part of said hub in such manner as to slide said traction blocks relative to said cable due to engagement of adjacent corners of said blocks, flexible anchoring means secured to the other end of said traction means and interposed between the parts of said dual wheel and between said tires with an end portion extending through an aperture in one part of the wheel, and means disjointably connected with said flexible anchoring means and with one part of said dual wheel and effective to impart a substantial tension force to said second flexible anchoring means and to said cable.

* * * * *